United States Patent
Nakashima (10) Patent No.: US 10,410,044 B2
(45) Date of Patent: Sep. 10, 2019

(54) IMAGE PROCESSING APPARATUS, IMAGE PROCESSING METHOD, AND STORAGE MEDIUM FOR DETECTING OBJECT FROM IMAGE

(71) Applicant: CANON KABUSHIKI KAISHA, Tokyo (JP)

(72) Inventor: Daisuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 15/633,581

(22) Filed: Jun. 26, 2017

(65) Prior Publication Data

US 2018/0005016 A1 Jan. 4, 2018

(30) Foreign Application Priority Data

Jun. 30, 2016 (JP) .................. 2016-130609

(51) Int. Cl.
*G06K 9/00* (2006.01)
*G06K 9/32* (2006.01)
*G06T 7/00* (2017.01)

(52) U.S. Cl.
CPC ..... *G06K 9/00228* (2013.01); *G06K 9/00362* (2013.01); *G06K 9/00369* (2013.01); *G06K 9/00993* (2013.01); *G06K 9/3241* (2013.01); *G06T 7/00* (2013.01); *G06T 2207/30201* (2013.01)

(58) Field of Classification Search
CPC ... G06K 9/00; G06K 9/00221; G06K 9/00979
See application file for complete search history.

(56) References Cited

U.S. PATENT DOCUMENTS

| 7,643,658 B2 * | 1/2010 | Kilner ................ G06K 9/00221 382/103 |
| 2012/0269395 A1 * | 10/2012 | Coulter .............. G06K 9/00369 382/103 |

FOREIGN PATENT DOCUMENTS

| JP | 4658788 B2 | 3/2011 |
| JP | 5027030 B2 | 9/2012 |

OTHER PUBLICATIONS

Viola, et al., "Rapid Object Detection using a Boosted Cascade of Simple Features", Accepted Conference on Computer Vision and Pattern Recognition, 2001, vol. 1, pp. 511-518.

* cited by examiner

*Primary Examiner* — Duy M Dang
(74) *Attorney, Agent, or Firm* — Canon U.S.A., Inc. IP Division (57) ABSTRACT

An image processing apparatus includes: an input unit configured to input image data; a detection unit configured to execute a detection process that detects a plurality of objects from the input image data; an integration unit configured to, after the detection process ends, integrate the plurality of detected objects on the basis of respective positions of the plurality of detected objects in the image data; an estimation unit configured to, before the detection process ends, estimate an integration time required for the integration unit to integrate the plurality of detected objects; and a termination unit configured to terminate the detection process by the detection unit on the basis of the estimated integration time and an elapsed time of the detection process by the detection unit.

15 Claims, 9 Drawing Sheets

| i | COORDINATES | | EVALUATION VALUE WITH RESPECT TO INPUT PIXEL VALUE | | | | | | THRESHOLD VALUE |
|---|---|---|---|---|---|---|---|---|---|
| | x | y | 0 | 1 | 2 | ... | 255 | | |
| 0 | 21 | 35 | 26 | 32 | 30 | ... | 1 | | 3 |
| 1 | 5 | 52 | 4 | 7 | 5 | ... | 62 | | 30 |
| 2 | 46 | 12 | 20 | 35 | 41 | ... | 12 | | 41 |
| ... | ... | ... | ... | ... | ... | ... | ... | | ... |
| N−1 | 15 | 20 | 2 | 6 | 10 | ... | 30 | | 2534 |

IMAGE PROCESSING APPARATUS, IMAGE PROCESSING METHOD, AND STORAGE MEDIUM FOR DETECTING OBJECT FROM IMAGE

BACKGROUND OF THE INVENTION

Field of the Invention

The present invention relates to an image processing apparatus, an image processing method, and a storage medium for detecting an object such as a human body and a human face in an image.

Description of the Related Art

Techniques of detecting a specific object such as a human body and a human face in an image have attracted attention in recent years.

Objects to be detected vary in position and size in images. Therefore, Japanese Patent No. 5027030 describes that objects are detected by the following flow of processes. First, in order to detect objects with different sizes, a plurality of images with different reduction ratios is generated from an input image. Next, in order to detect the objects that exist at different positions, each of the images is scanned in a window in a predetermined size, and object detection is executed in the window. Even if the objects are identical in the plurality of images with different reduction ratios, a plurality of detection results for the plurality of objects having different positions and sizes in the images is generated. Therefore, lastly, the plurality of detection results detected for the identical objects is integrated.

Furthermore, there is a technique that allows an object detection process to be completed within a predetermined time in order to improve a real-time characteristic of the object detection process in a case where the process is executed on an embedded system such as a mobile terminal and an on-vehicle device. One exemplary technique for speeding up an object detection process in a window is a technique proposed by P. Viola, M. Jones, "Rapid Object Detection using a Boosted Cascade of Simple Features". Proceedings of IEEE Conference on Computer Vision and Pattern Recognition, Vol. 1, pp. 511-518, December 2001. Another exemplary technique is described in Japanese Patent No. 4658788. In the literature published by P. Viola et al., a discriminator includes cascade-connected weak discriminators and the weak discriminators are processed sequentially. Whether to process the next weak discriminator is determined on the basis of a discrimination result of the present weak discriminator. In a case where it is determined not to process the next weak discriminator, processes for the rest of the weak discriminators are omitted.

Meanwhile, Japanese Patent No. 4658788 proposes a technique that guarantees a real-time characteristic of an object detection process on an assumption that the object detection process is executed on an embedded system. With the technique, when a predetermined time has passed, the embedded system suspends the object detection process and outputs a detection result obtained at that point of time.

However, with the technique proposed by Viola et al., a processing time varies according to the number of weak discriminators processed. In addition, a processing time for an integration process using the technique varies according to the number of detected objects before integration. This makes it difficult to guarantee that an integration process for all images is completed within a predetermined time.

Meanwhile, according to the technique proposed in Japanese Patent No. 4658788, when a predetermined time has passed, an object detection process is terminated without an integration process being executed. As a result, a plurality of detection results is output for one object. Such non-integrated detection results are hard to handle in a subsequent process in which the detection results are used. For example, in a case where a collation is executed as to whether a detected object matches an object registered in a database, a collation time increases as compared to cases where integration has been completed. Alternatively, in a case where an object in each frame is tracked using detection results of objects in consecutive frames, time required to associate detected objects in frames increases as compared to cases where integration has been completed. A failure in associating the detected objects in the frames causes erroneous tracking.

Accordingly, there is a need for providing an image processing apparatus that completes an integration process of detection results for an object even if an object detection process is terminated halfway.

SUMMARY OF THE INVENTION

According to one aspect of the present disclosure, an image processing apparatus includes: an input unit configured to input image data; a detection unit configured to execute a detection process that detects a plurality of objects from the input image data; an integration unit configured to, after the detection process ends, integrate the plurality of detected objects on the basis of respective positions of the plurality of objects in the image data; an estimation unit configured to, before the detection process ends, estimate an integration time required for the integration unit to integrate the plurality of detected objects; and a termination unit configured to terminate the detection process by the detection unit on the basis of the estimated integration time and an elapsed time of the detection process by the detection unit.

Further features of the present disclosure will become apparent from the following description of exemplary embodiments (with reference to the attached drawings).

DESCRIPTION OF THE EMBODIMENTS

A first embodiment will be described in detail below with reference to the drawings.

<Exemplary Configuration of Image Processing Apparatus>

Figure 1A:
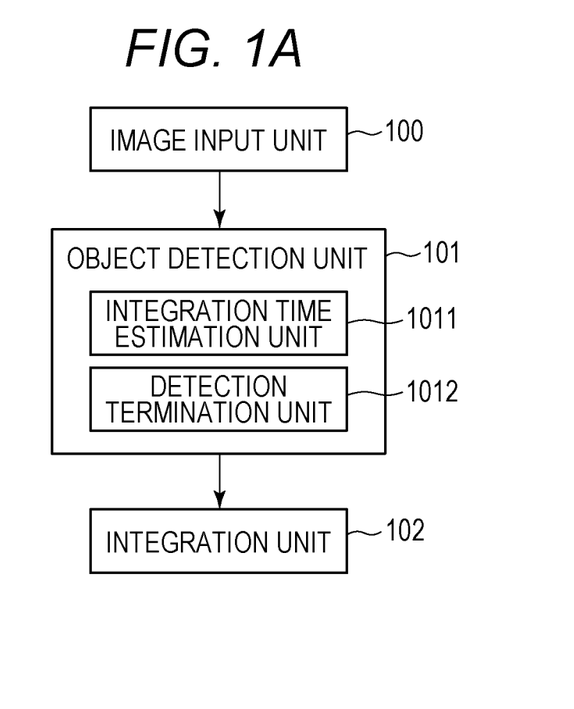
FIG. 1A is a block diagram showing a functional configuration of an image processing apparatus according to a first embodiment.

FIG. 1A is a block diagram showing a functional configuration of an image processing apparatus according to the present embodiment. The image processing apparatus according to the present embodiment has an image input unit 100, an object detection unit 101, and an integration unit 102. The image input unit 100 inputs image data from an external device (not shown) or a storage unit (not shown). The object detection unit 101 detects objects from the input image data. The integration unit 102 integrates the detected objects. The object detection unit 101 has an integration time estimation unit 1011 that estimates time for the integration unit 102 to integrate the objects. Additionally, the object detection unit 101 has a detection termination unit 1012 that terminates a detection process by the object detection unit 101 such that an integration process for the objects by the integration unit 102 is completed within a predetermined time. Note that an object to be detected according to the present embodiment is a human face or a human body, but not limited thereto.

Figure 4:
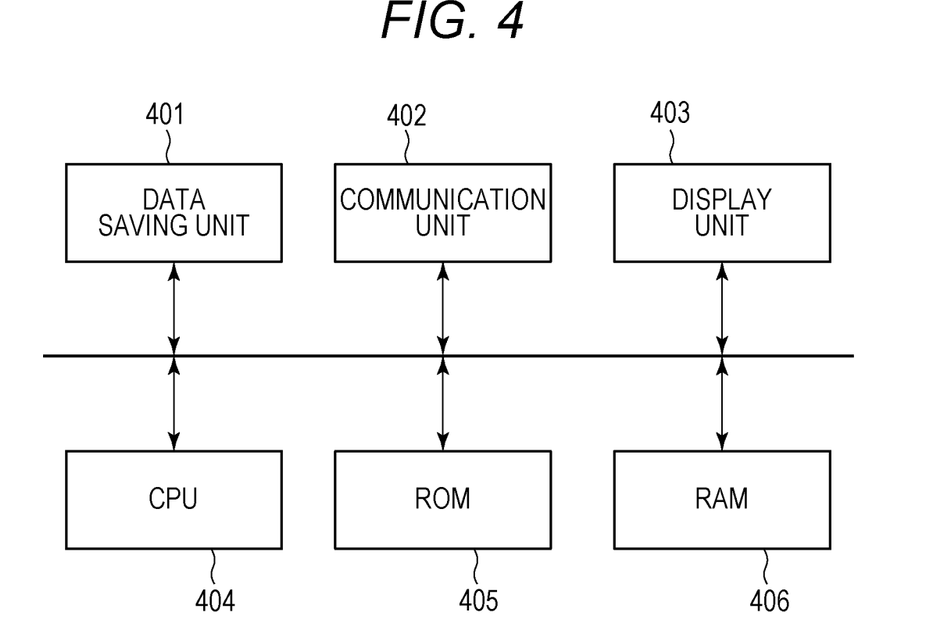
FIG. 4 is a block diagram showing a hardware configuration of the image processing apparatus according to the first embodiment.

FIG. 4 is a block diagram showing an example of a hardware configuration of an image processing apparatus that can implement an object detection method.

A data saving unit 401 holds image data. The data saving unit 401 includes, for example, a hard disk, a flexible disk, a compact disc read only memory (CD-ROM), a compact disc recordable (CD-R), a digital versatile disc (DVD), a memory card, a CF card, SmartMedia, an SD card, a memory stick, an xD picture card, and a USB memory. In the data saving unit 401, it is possible to save a program and other data in addition to the image data. Alternatively, a part of a RAM 406 that will be described later may be used as the data saving unit 401. Alternatively, a virtual configuration may be used. For example, a storage device is connected as a connection destination device by and used via the communication unit 402 that will be described later.

A display unit 403 is a device that displays an object detection result and image data for a graphical user interface (GUI) or the like. A cathode ray tube (CRT), a liquid crystal display or the like is generally used for the display unit 403. Alternatively, an external display device connected via a cable or the like may be used. The display unit 403 displays, for example, frames of detection results for an input image such that the frames are superimposed on each other.

A CPU 404 executes a main process according to the present embodiment and controls the operation of the entire image processing apparatus. A ROM 405 and the RAM 406 provide the CPU 404 with a program, data, a work area, and the like necessary for the process. In a case where a program necessary for a process that will be described later is stored in the data saving unit 401 or the ROM 405, the program is read once by the RAM 406 and then executed. Alternatively, in a case where the image processing apparatus receives the program via the communication unit 402, the program is recorded once in the data saving unit 401 and then read by the RAM 406, or the program is read directly to the RAM 406 from the communication unit 402 and then executed.

The CPU 404 reads an image written to the RAM 406 and then executes the object detection process according to the present embodiment. The CPU 404 writes to the RAM 406 data being processed and reads the data when necessary. Then, the CPU 404 writes to the RAM 406 an object detection result or displays the object detection result in the display unit 403. Alternatively, the CPU 404 transmits the object detection result to the external device via the communication unit 402.

Note that although FIG. 4 shows one CPU 404, a plurality of CPUs may be provided.

The communication unit 402 is an interface (I/F) for communication between devices. Alternatively, the communication unit 402 may use a wired communication method, for example, a method using a publicly known local area network, a universal serial bus (USB), IEEE1284, IEEE1394, or telephone line. Alternatively, the communication unit 402 may use a wireless communication method such as a method using infrared rays (IrDA), IEEE802.11a, IEEE802.11b, IEEE802.11g, IEEE802.11n, Bluetooth (registered trademark), or ultra wide band (UWB).

Note that although FIG. 4 shows a configuration in which the data saving unit 401 and the display unit 403 are all included in one image processing apparatus, these units may be connected via a communication route by a publicly known communication method, and as a result, these units generally may constitute such configuration.

With respect to a system configuration, there are various components in addition to those described above. However, since the components are not main components for the present embodiment, description of the components will be omitted.

What the image processing apparatus shown in FIG. 4 process will be described with reference to a flowchart. The following flowchart is realized by the CPU 404 executing a control program.

<Object Detection Method>

In an object detection method according to the present embodiment, time required for an integration process is estimated at a predetermined timing during a detection process on the basis of the number of objects detected before the predetermined timing. Then, the detection process is terminated such that the integration process is completed within a remaining time. Note that image data is assumed to be input data.

Figure 1B:
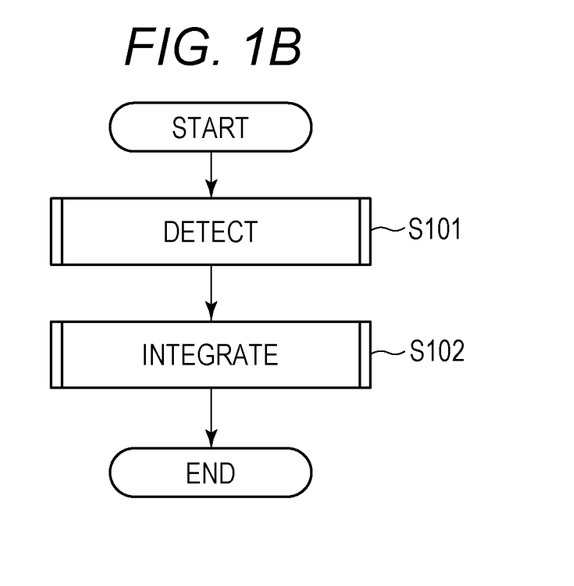
FIG. 1B is a flowchart showing a flow of an object detection method according to the first embodiment.

FIG. 1B is a flowchart showing a flow of the object detection method according to the first embodiment. As shown in FIG. 1B, the object detection method generally includes the detection process (step S101) and the integration process (step S102). A flow of the detection process and a flow of the integration process will be described with reference to FIGS. 2 and 3 respectively.

Figure 2:
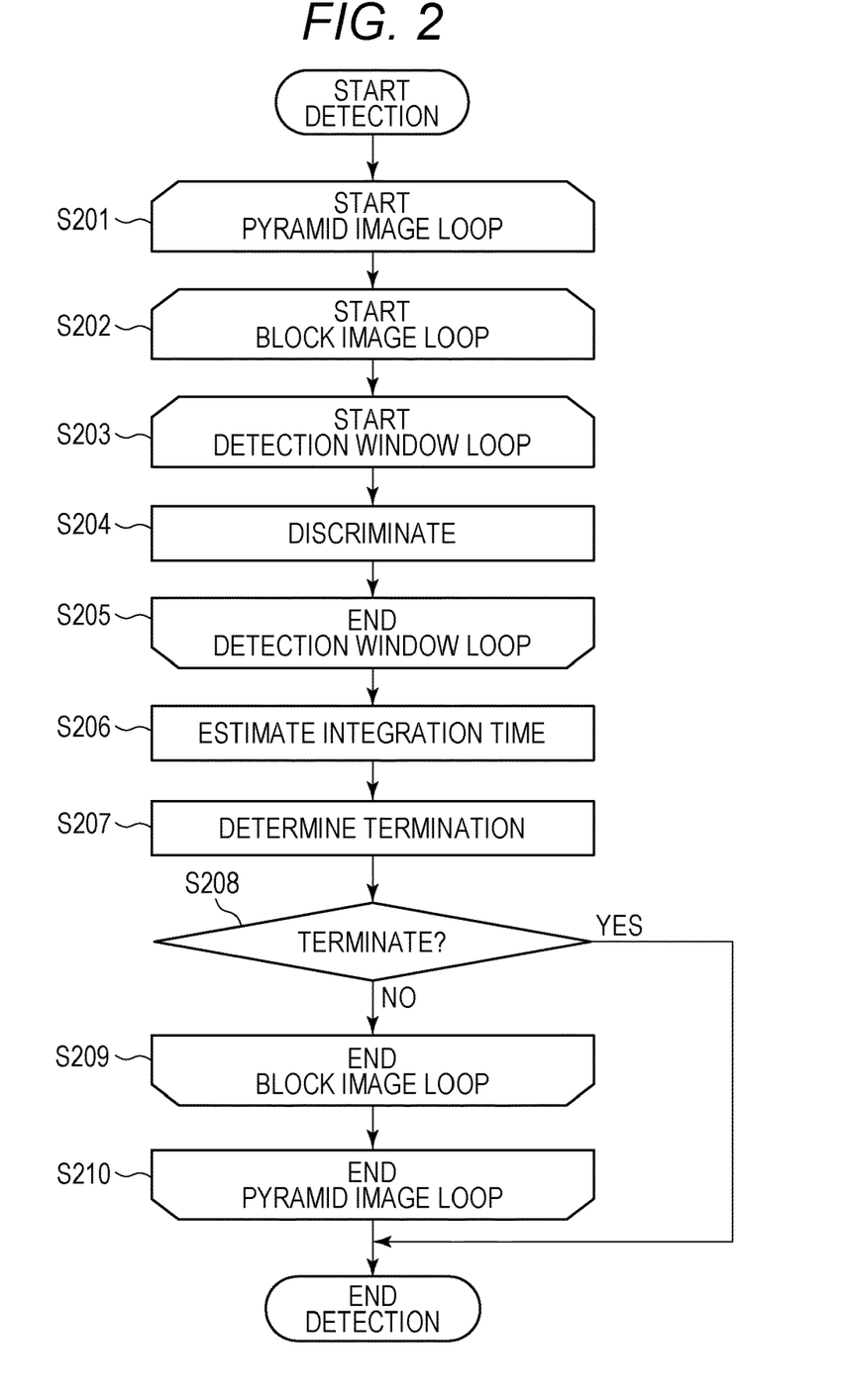
FIG. 2 is a flowchart showing a flow of a detection process according to the first embodiment.
Figure 5A:
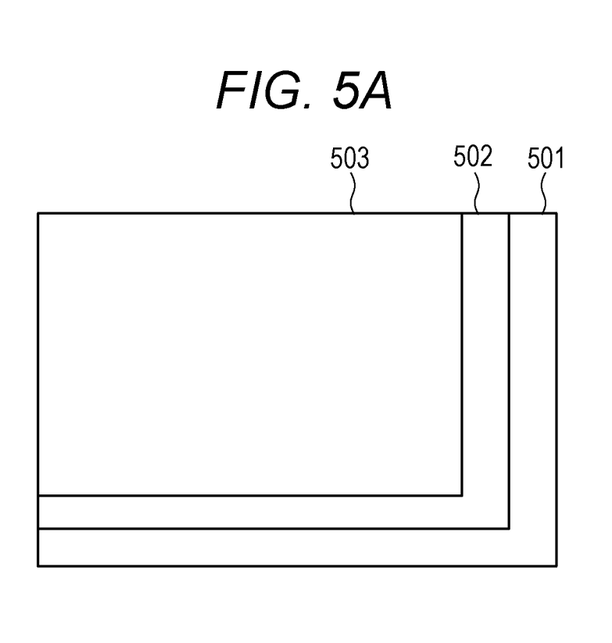
FIG. 5A is a view describing a pyramid image of the detection process according to the first embodiment.

The flow of the detection process will be described with reference to FIG. 2. In steps S201 to S203, various repetitive loops start. Each of the repetitive loops will be described with reference to FIGS. 5A and 5B.

In step S201, with respect to pyramid images input from the image input unit 100, the object detection unit 101 starts a repetitive loop of the pyramid images. The pyramid images mean input image data 501, reduced image data 502, and reduced image data 503 shown in FIG. 5A. The reduced image data 502 and 503 have been generated from the input image data 501 and are different in reduction ratios. Note that although a set of the pyramid images shown in FIG. 5A includes three images, the set of the pyramid images may include any plural number of images other than three images. In the present embodiment, the pyramid image generated from the input image data 501 by a pyramid image generation unit (not shown) is stored in the RAM 406 in advance. The image input unit 100 inputs and uses the pyramid images, thereby allowing the object detection unit 101 to detect objects with different sizes in the input image data 501. According to the present embodiment, the pyramid images are processed in ascending order of the image data size, that is, in order of the reduced image data 503, the reduced image data 502, and the input image data 501 that are pyramid images. This is to ensure that in a case where the detection process is terminated halfway, a relatively large object in the images is prioritized as a detection result.

Note that although the present embodiment describes an example in which object detection is executed for a plurality of pyramid images generated from an input image, it is unnecessary to limit a target to be detected by the object detection process to a pyramid image.

Furthermore, there may be a plurality of sizes for detection windows. For example, detection windows with different sizes may be prepared in advance, and input images may be subjected to raster scan in descending order of detection window size. Thus, objects with different sizes may be detected.

Furthermore, it is not always necessary to detect a relatively large object preferentially. For example, a weak discriminator that accurately detects a man's face or body rather than a woman's face or body may be used. As a result, a man's face or body may be detected preferentially.

Figure 5B:
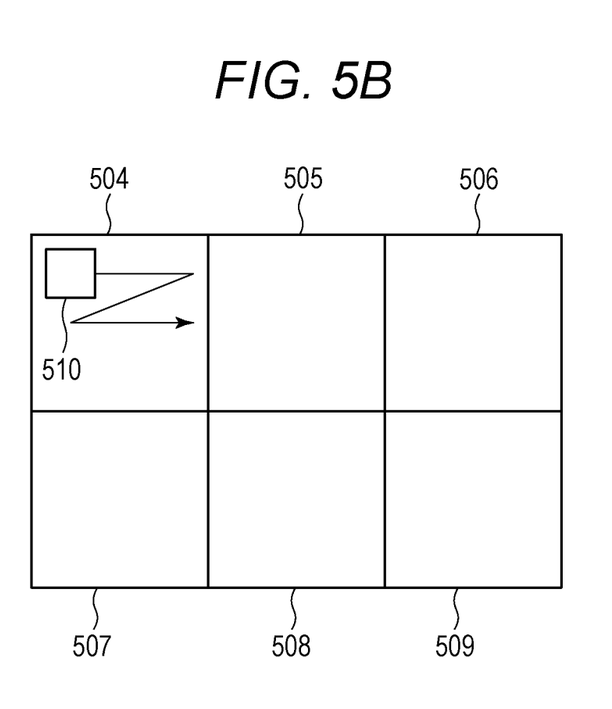
FIG. 5B is a view describing a block image of the detection process according to the first embodiment.

In step S202, the object detection unit 101 starts a repetitive loop of block images. The block images mean images obtained by dividing a pyramid image into a block shape. For example, as shown in FIG. 5B, the input image data 501 is divided into a plurality of block images 504 to 509. In the present embodiment, the object detection unit 101 processes the block images in order of raster. Note that although FIG. 5B describes that blocks do not overlap each other, blocks may overwrap each other such that a detection window 510 that will be described later is consecutive in a pyramid image.

In step S203, the object detection unit 101 starts a repetitive loop of detection windows. The detection window means an image that becomes a process unit of the detection process. The object detection unit 101 subjects the detection window 510 shown in FIG. 5 to raster scan in a block image, thereby determining whether an object is included in the detection window 510.

Figure 6:
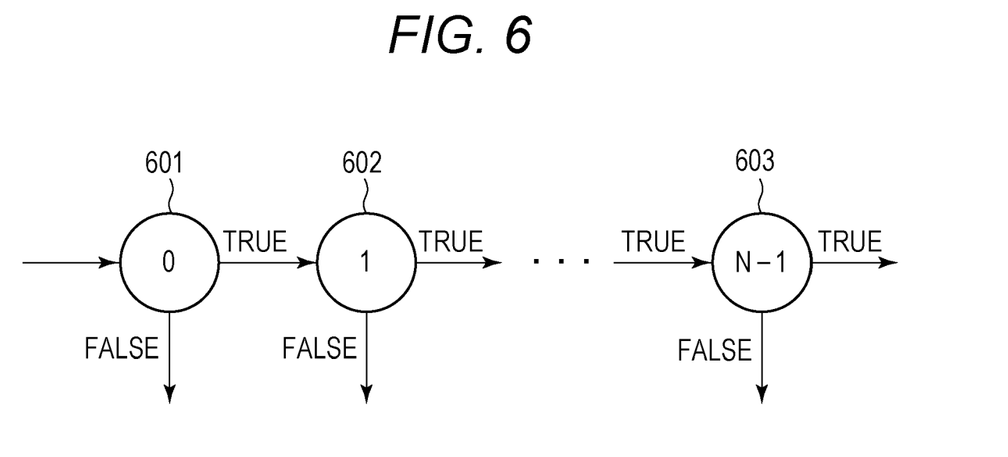
FIG. 6 is a diagram describing a logical structure of a discrimination process according to the first embodiment.

In step S204, the object detection unit 101 executes a discrimination process for the detection window. FIG. 6 is a diagram describing a logical structure of the discrimination process by the object detection unit 101 according to the present embodiment.

In the present embodiment, the object detection unit 101 uses a discriminator including N cascade-connected weak discriminators. A weak discriminator 601, a weak discriminator 602, and a weak discriminator 603 are the first, the second, and the N-th weak discriminators respectively. In order from the first to the N-th, the weak discriminators execute the discrimination process. Each weak discriminator determines whether an object to be detected exists (True) or the object to be detected does not exist (False) according to a discrimination parameter that has been created in advance through machine learning such as Boosting. In a case where one weak discriminator makes a determination of True, the turn moves to the next weak discriminator. In a case where discrimination results of all weak discriminators are True, it is determined that the object to be detected exists in an area in the detection window. On the other hand, in a case where a discrimination result of any weak discriminator is False, it is determined at that point of time that the object to be detected does not exist in the area.

Figure 7:
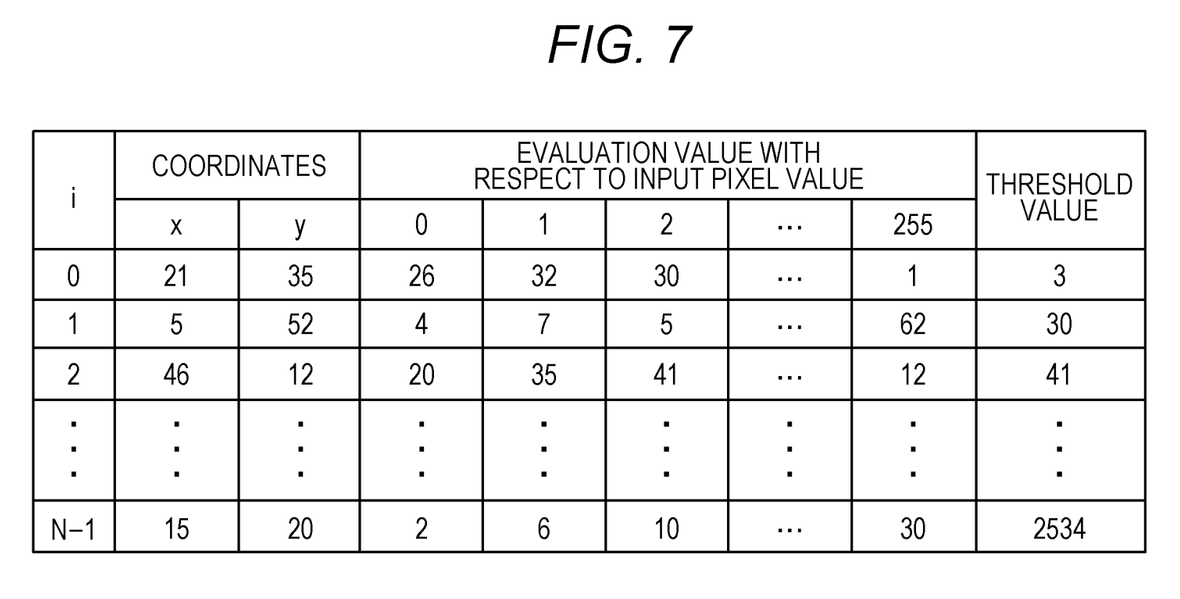
FIG. 7 is a table describing an example of a discrimination parameter set according to the first embodiment.

FIG. 7 is a table describing an example of a discrimination parameter according to the present embodiment. The discrimination parameter is stored in the RAM 406 or the ROM 405. Numbers in column i in FIG. 7 correspond to weak discriminator numbers in FIG. 6. Discrimination parameters for each of the weak discriminators include reference coordinates in the detection window, a conversion table that converts a pixel vale at the coordinates into an evaluation value that indicates an object-likeness of an object to be detected, and a threshold value for comparing with the evaluation value. The i-th weak discriminator makes a determination of True in a case where an accumulated value obtained by accumulating evaluation values of the 0-th to (i−1)th weak discriminators is a threshold value or more. Otherwise, the i-th weak discriminator makes a determination of False.

In step S205, the object detection unit 101 determines whether discrimination processes for all detection windows within the block have been completed. In a case where discrimination processes for all detection windows have been completed, the process proceeds to step S205, and the loop of detection windows ends. On the other hand, in a case where the discrimination processes for all detection windows have not been completed, the process returns to step S204, and discrimination process for the next detection window is executed.

In step S206, the integration time estimation unit 1011 estimates time required for an integration process by the integration unit 102 in step S102. In the present embodiment, an integration processing time is estimated on the basis of the number of objects detected by the object detection unit 101 up to this point of time (M). As will be described later, in the integration process of the present embodiment, a determination is made as to whether to execute integration on the basis of a coordinate distance between one detection object and the other detection object. Therefore, time required for the integration process is calculated using a value of $M^2$. An estimated time for the integration process $T_{int}$ is calculated according to the following formula. Note that values of A and B in the following formula are set in advance.

$$T_{int} = A \cdot M^2 + B \qquad (1)$$

Generally, time required for an integration process is dependent not only on the number of detected objects but also on a distribution of the detected objects. With consideration of the number and distribution of detected objects, the values of A and B are decided. In the present embodiment, an integration processing time for many experimental images that are different in the number and distribution of detected objects is calculated. The values of A and B are then decided such that integration processes for all experimental images are completed.

In step S207, the detection termination unit 1012 determines whether to terminate the detection process. On the assumption that an elapsed time since the detection process has started is $T_{det}$, an estimated time for the integration process that has been estimated in step S206 is $T_{int}$, and a predetermined period of time in which all processes are completed is $T_{total}$, the detection termination unit 1012 determines to terminate the detection process in a case where the following formula (2) holds. That is, the detection termination unit 1012 terminates the detection process when a total time obtained by adding the elapsed time since the detection process has started and the estimated time for the integration process is the set predetermined time or longer.

$$T_{total} < T_{det} + T_{int} \qquad (2)$$

In step S208, the detection termination unit 1012 terminates the detection process on the basis of a determination result in step S207. In a case where formula (2) holds, the detection process ends. On the other hand, in a case where formula (2) does not hold, the process proceeds to step S209, and the detection process continues. Note that the elapsed time $T_{det}$ is timed by the detection termination unit 1012, and the predetermined period of time $T_{total}$ is set in the detection termination unit 1012.

In a case where formula (2) holds, the detection process ends. On the other hand, in a case where formula (2) does not hold, the process proceeds to step S209, and the detection process continues.

In step S209, the object detection unit 101 determines whether processes for all block images in a pyramid image have been completed. In a case where the processes for all block images have been completed, the process proceeds to step S210, and a loop of block images ends. On the other hand, in a case where the processes for all block images have not been completed, the process returns to step S203, and a process for the next block image is executed.

In step S210, the object detection unit 101 determines whether processes for all pyramid images have been completed. In a case where the processes for all pyramid images have been completed, the detection process ends. On the other hand, in a case where the processes for all pyramid images have not been completed, the process returns to step S202, and a process for the next pyramid image is executed.

Figure 8A:
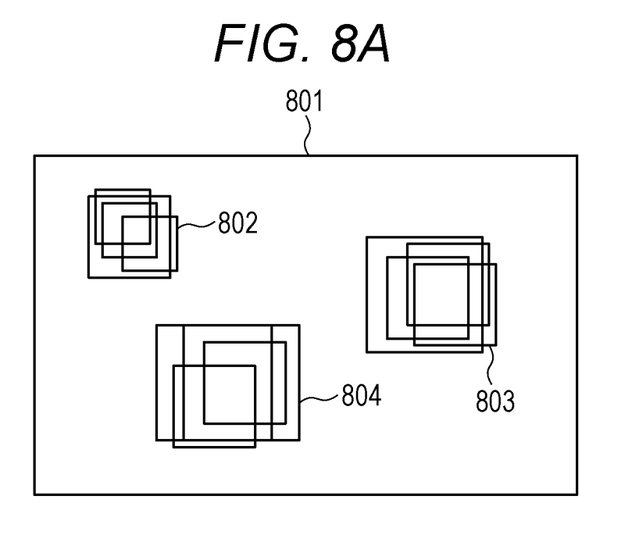
FIG. 8A is a view describing an example of a detection result according to the first embodiment.
Figure 8B:
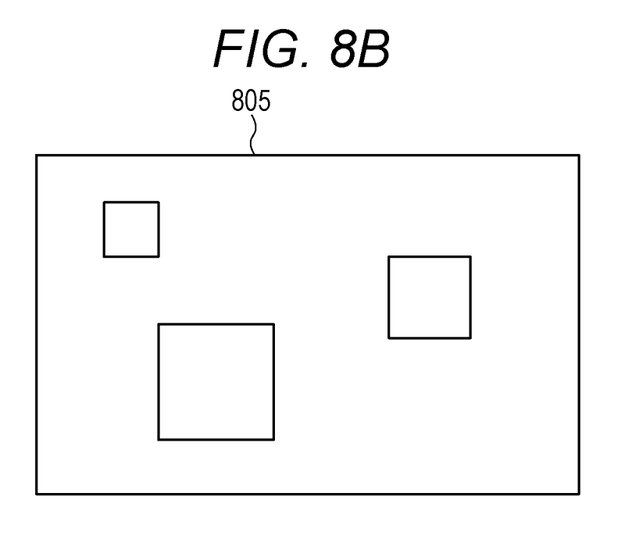
FIG. 8B is a view describing an example of an integration result according to the first embodiment.

FIG. 8A is a view describing an example of a detection result. The above-described detection process obtains a detection result 801 as shown in FIG. 8A. A rectangle in the detection result 801 shows a detection window in which an object has been detected. A plurality of detection windows detected in reduced images that are pyramid images for one object is enlarged to sizes and positions in the input image. For example, a detection window 802, a detection window 803, and a detection window 804 correspond to a detection result in the input image data 501, a detection result in the reduced image data 502, and a detection result in the reduced image data 503, respectively. Through an integration process that will be described later, detection results positions of which are close to each other in the input image data 501 are integrated as a detection result detected for one object, and an integration result 805 shown in FIG. 8B is generated.

A flow of the integration process will be described with reference to FIG. 3. The integration unit 102 starts an integration process loop of a detection result i for i=1 to n in step S301. The integration unit 102 starts an integration process loop of a detection result j for j=1 to n in step S302. The integration unit 102 compares a detection result i and a detection result j with respect to the N detection results obtained by the object detection unit 101.

In step S303, the integration unit 102 determines whether the detection result i and the detection result j are identical detection results. In a case where the two results are identical detection results, no process is executed, and the process goes to step S306. On the other hand, in a case where the two results are different detection results, the process goes to step S304.

In step S304, the integration unit 102 determines whether a distance between the detection result i and the detection result j on the input image is equal to or less than a predetermined threshold value. The distance on the input image is a Euclidean distance between upper-left vertex coordinates of rectangles that are detection results. In a case where the distance is equal to or less than the predetermined threshold value, the process goes to step S305. On the other hand, in a case where the distance is larger than the predetermined threshold value, the process goes to step S306.

In step S305, the integration unit 102 compares an accumulated evaluation value of the detection result i and an accumulated evaluation value of the detection result j and deletes the detection result i or the detection result j, whichever is lower in terms of the accumulated evaluation value. Thus, the integration unit 102 integrates the detection results. In a case where the integration process is completed, the integration unit 102 updates the detection results, the process goes to step S301, and a repetitive loop for detection results after the updating starts.

In steps S306 and S307, determinations are made as to whether integration process loops for i and j have been completed, respectively. In a case where it is determined that the integration process loop for i has been completed in step S306, the process goes to step S307. On the other hand, in a case where it is determined that the integration process loop for i has not been completed, the process returns to step S302, and a process for the next detection result j starts.

The process continues until all detection results with a distance that is less than or equal to the threshold value are integrated through the above process.

Figure 3:
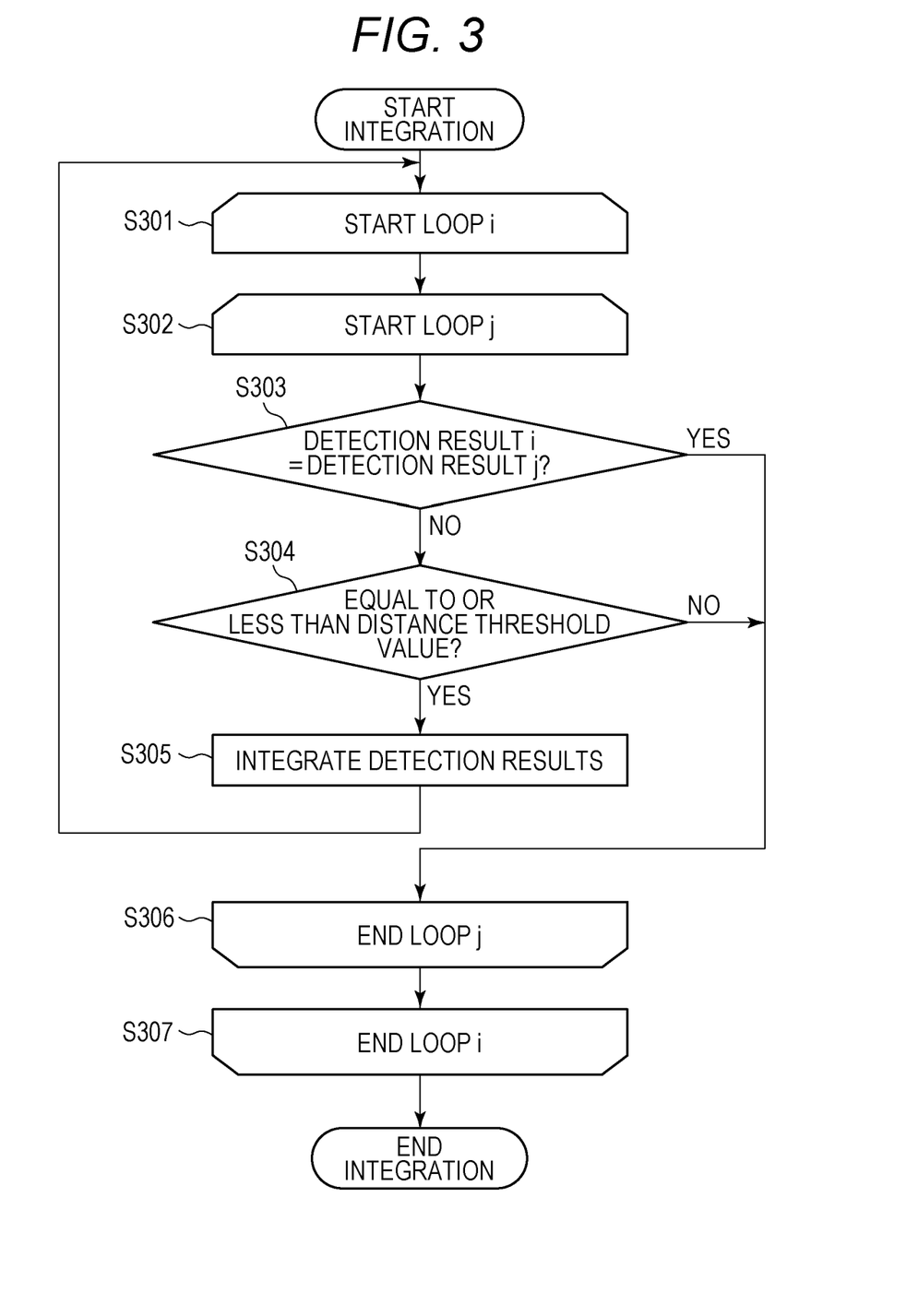
FIG. 3 is a flowchart showing a flow of an integration process according to the first embodiment.

In the present embodiment, a procedure shown in FIG. 3 has been described as an example of the integration process, but the procedure for integration process is not limited to the above-described procedure. For example, a table that converts all coordinates in a predetermined area in an image into the central coordinates in the area may be provided. Integration may be executed by applying the conversion table to upper left coordinates of a detection result.

As described above, in the object detection method according to the present embodiment, each time the detection process for a block image is completed, time required for the integration process is estimated on the basis of the number of objects detected until that time. Then, the detection process is terminated such that the integration process is completed within a remaining time. As a result, the integration process is not terminated halfway. This provides an advantage that it is possible to obtain detection results that will be easy to handle in a subsequent process.

In the present embodiment, each time the detection process for one block image is completed, an integration processing time is estimated. However, timing when the integration processing time is estimated is not limited to the above-described timing. The integration processing time may be estimated when the detection process for one pyramid image has been completed or when the detection process for one detection window has been completed. Alternatively, the integration processing time may be estimated when the detection process has been completed for any of the following: a plurality of pyramid images, a plurality of blocks, and a plurality of detection windows.

According to the above-described image processing apparatus, it is possible to improve a real-time characteristic of the object detection process by terminating the object detection process such that the integration process for object detection results is completed within a predetermined time.

Next, a second embodiment will be described. The following description will be focused on differences from the first embodiment.

In the object detection method according to the first embodiment, each time the detection process for a block image is completed, time required for the integration process is estimated using the number of detected objects. Then, the detection process is terminated such that all processes are completed within a predetermined time.

Meanwhile, the second embodiment assumes that the process shown in FIG. 1 is executed for each frame of an input moving image. The integration time estimation unit 1011 estimates time required for an integration process for a presently input frame, using an integration processing time required for the image processing apparatus to have executed an integration process for a frame immediately before this point of time. Then, the detection termination unit 1012 terminates a detection process before the detection process ends such that all processes for the present frame are completed within a predetermined time.

Figure 9:
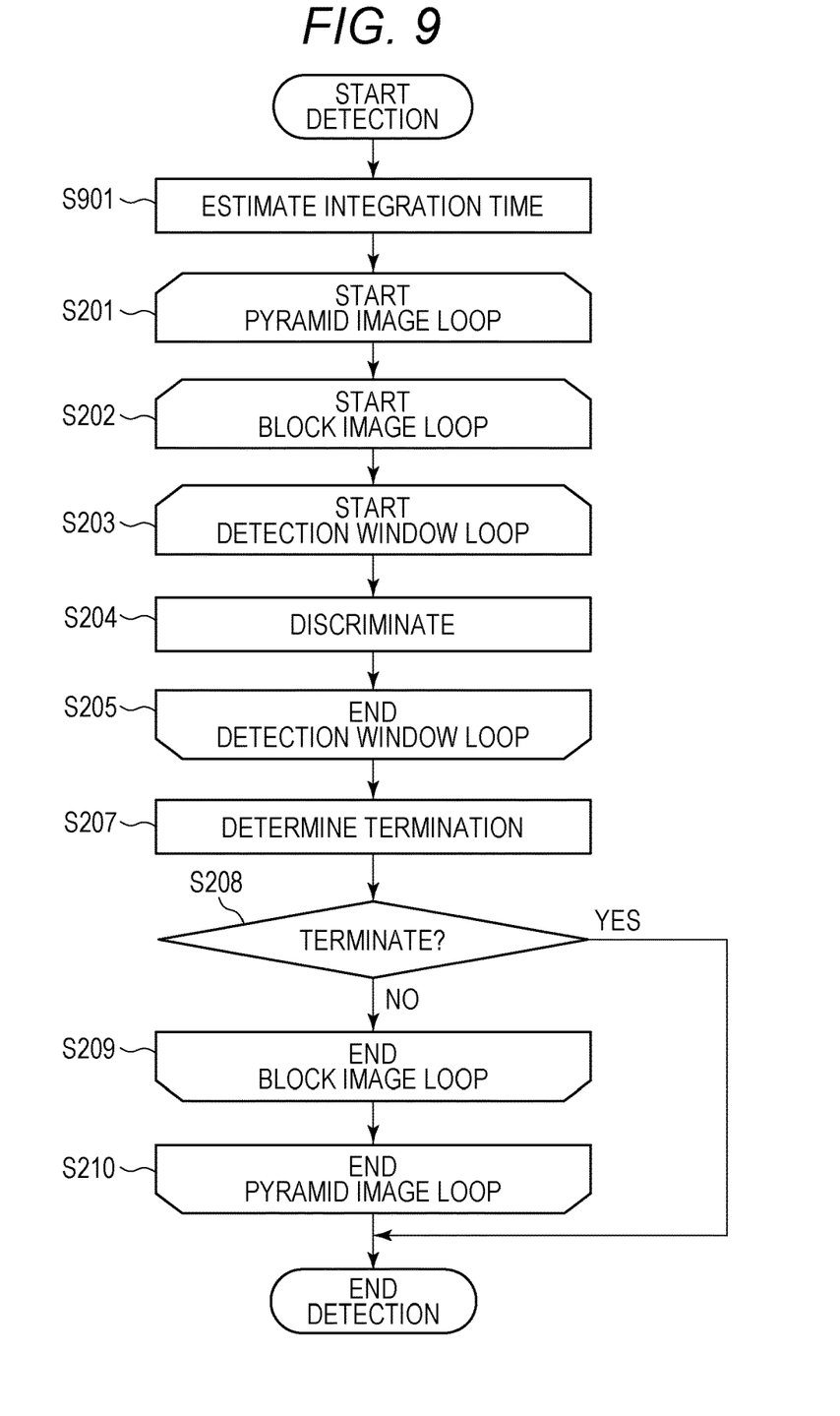
FIG. 9 is a flowchart showing a flow of a detection process according to a second embodiment.

FIG. 9 is a flowchart showing a flow of the detection process according to the second embodiment.

In step S901, the integration time estimation unit 1011 estimates time required for the integration process in step S102. In the present embodiment, the integration time estimation unit 1011 calculates an estimated time $T_{int}$ for the integration process for a presently input frame according to the following formula (3) on the basis of the integration processing time ($T_{past}$) for the previous frame (frame that has been subjected to the detection process immediately before this point of time).

$$T_{int} = T_{past} + C \tag{3}$$

where C represents a constant for margin. Even if frames are consecutive frames, a detection result varies for each frame. Therefore, the integration processing time for the previous integration process is not used as it is, and a predetermined margin is set. Note that $T_{past}$ for a first frame is estimated using the method according to the first embodiment. Alternatively, a maximum value among values of the integration processing time measured in advance for many experimental images is used as $T_{past}$ for the first frame.

Note that in the description in FIG. 9, the integration processing time is estimated on the basis of the time required for the integration process for the frame that has previously been processed. However, a basis on which the integration processing time is estimated is not limited thereto. The integration processing time may be calculated on the basis of an average value or a maximum value of values of time required for integration processes for a plurality of previously processed frames.

As described above, in the object detection method according to the present embodiment, the time required for the integration process for the present frame is calculated on the basis of the integration processing time for the previous frame. It is only necessary to execute the estimation of the integration processing time once when the detection process for the present frame starts. Accordingly, the object detection method according to the present embodiment can shorten the time required for the estimation as compared to the method according to the first embodiment.

Next, a third embodiment will be described.

In the first embodiment, the time required for the integration process is estimated on the basis of the number of detected objects. In the third embodiment, the integration processing time is estimated on the basis of a distribution of detected objects. That is, the integration processing time estimated in the present embodiment varies depending on a distance between objects even if the number of detected objects is the same. For example, the integration processing time becomes shortest in a case where there is no object positioned at a short distance from other object in an input image. On the other hand, the integration processing time becomes longer in a case where there are many objects positioned at a short distance from other object in the latter half of a detection result loop. Accordingly, the integration time estimation unit 1011 according to the present embodiment changes the values of A and B in formula (1) on the basis of the number of objects and a distance between objects.

In a case where the number of objects alone is used, an estimated time may become longer than necessary. This is because, in order to guarantee that integration processes for all input images are completed, the estimated time is decided on the assumption of a distribution of objects that may result in a longest processing time. Meanwhile, in a case where the number of objects and information on a distribution of objects are used, an extra time included in the estimated time becomes shortened. This provides an advantage that time during which the detection process is executable becomes longer, thereby improving detection accuracy.

Note that although in the first embodiment and the second embodiment, the integration processing time is estimated during the execution of the detection process, the integration processing time may be estimated in advance. For example, the integration processing time may be estimated in the following manner. First, integration processing time for many experimental images that are different in the number and distribution of detected objects is measured. Next, a predetermined margin is added to a maximum time among the measured integration processing time. A resultant value is an estimated time.

Furthermore, in the first embodiment and the second embodiment, a process to be terminated is the detection process. However, in a case where the integration process is not completed within the estimated time, all processes may be terminated when the elapsed time since the start of the detection process reaches $T_{total}$.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130609, filed Jun. 30, 2016, which is hereby incorporated by reference herein in its entirety.

What is claimed is:

1. An image processing apparatus, comprising:
a memory;
a processor coupled to the memory which executes the following:
inputting image data;
executing a detection process that detects a plurality of objects from the input image data;
after the detection process ends, integrating the plurality of detected objects on the basis of respective positions of the plurality of objects in the image data;
before the detection process ends, estimating an integration time required for integrating the plurality of detected objects; and
terminating the detection process in a case where a total time obtained by adding the integration time and the elapsed time is equal to or longer than a predetermined time,
wherein a real-time characteristic of the detection process is improved when integrating the plurality of detected objects in the image data is completed within the predetermined time.

2. The image processing apparatus according to claim 1, wherein, at a point of time during the detection process, an integration time required to integrate objects detected until the point of time is estimated.

3. The image processing apparatus according to claim 1, wherein the integration time is estimated on the basis of the number of the plurality of detected objects.

4. The image processing apparatus according to claim 1, wherein the integration time is estimated on the basis of a distance between the plurality of detected objects.

5. The image processing apparatus according to claim 1, wherein the image data is input as one frame of a moving image, and
an integration time is estimated for one frame of interest on the basis of an integration time for another frame that has been input and has been integrated before the one frame of interest is input.

6. The image processing apparatus according to claim 1, wherein the image data is input as one frame of a moving image, and
an integration time is estimated for one frame of interest on the basis of an integration time for each of a plurality of frames that have been input and have been integrated before the one frame of interest is input.

7. The image processing apparatus according to claim 6, wherein the integration time is estimated for the one frame of interest on the basis of an average value or a maximum value of integration time for the plurality of frames that have been input and have been integrated before the one frame of interest is input.

8. The image processing apparatus according to claim 7, wherein an integration time required to integrate the plurality of detected objects is estimated when the process that detects an object from each of the plurality of items of reduced image data is ended.

9. The image processing apparatus according to claim 1, further comprising generating a plurality of items of reduced image data with different reduction ratios from the input image data,
wherein an object is detected with respect to each of the input image data and the plurality of items of reduced image data.

10. The image processing apparatus according to claim 9, wherein an object is detected, in ascending order of image data size, from each of the input image data and the plurality of items of reduced image data.

11. The image processing apparatus according to claim 10, wherein an object is detected by causing a detection window to scan each of the input image data and the plurality of items of reduced image data.

12. The image processing apparatus according to claim 1, wherein an object is detected by causing a plurality of detection windows with different sizes to scan the input image data.

13. The image processing apparatus according to claim 12, wherein an object is detected by causing the plurality of detection windows to scan the input image data in descending order of detection window size.

14. An image processing method comprising:
inputting image data;
detecting by executing a detection process that detects a plurality of objects from the input image data;
integrating, after the detection process ends, the plurality of object on the basis of respective positions of the plurality of detected objects in the image data;
estimating, before the detection process ends, an integration time required to integrate the plurality of detected objects in the integrating; and
terminating the detection process in the detecting in a case where a total time obtained by adding the integration time and the elapsed time is equal to or longer,
wherein a real-time characteristic of the detection process is improved when integrating the plurality of detected objects in the image data is completed within the predetermined time.

15. A non-transitory computer-readable storage medium storing a program that causes a computer to execute:
inputting image data;
detecting by executing a detection process that detects a plurality of objects from the input image data; and
integrating, after the detection process ends, the plurality of detected objects on the basis of respective positions of the plurality of detected objects in the image data,
wherein, in the detecting, the program causes the computer to execute:
estimating, before the detection process ends, an integration time required to integrate the plurality of detected objects in the integrating; and
terminating the detection process in the detecting in a case where a total time obtained by adding the integration time and the elapsed time is equal to or longer than a predetermined time,
wherein a real-time characteristic of the detection process is improved when integrating the plurality of detected objects in the image data is completed within the predetermined time.

* * * * *